(12) United States Patent
Aasen et al.

(10) Patent No.: US 12,323,658 B2
(45) Date of Patent: Jun. 3, 2025

(54) DEVICES, SYSTEMS, AND METHODS FOR REAL TIME AUDIENCE MEASUREMENT IN HOSPITALITY ENVIRONMENTS

(71) Applicant: Sonifi Solutions, Inc., Sioux Falls, SD (US)

(72) Inventors: Eric Aasen, Sioux Falls, SD (US); Joshua H. Pulford, Sioux Falls, SD (US); Leon P. Stoel, Sioux Falls, SD (US)

(73) Assignee: Sonifi Solutions, Inc., Sioux Falls, SD (US)

( * ) Notice: Subject to any disclaimer, the term of this patent is extended or adjusted under 35 U.S.C. 154(b) by 275 days.

(21) Appl. No.: 17/890,556

(22) Filed: Aug. 18, 2022

(65) Prior Publication Data

US 2024/0064372 A1 Feb. 22, 2024

(51) Int. Cl.
*H04N 21/442* (2011.01)
*H04N 21/658* (2011.01)

(52) U.S. Cl.
CPC ... *H04N 21/44222* (2013.01); *H04N 21/6582* (2013.01)

(58) Field of Classification Search
CPC ......... H04N 21/44222; H04N 21/6582; H04N 21/2143
See application file for complete search history.

(56) References Cited

U.S. PATENT DOCUMENTS

| | | | |
|---|---|---|---|
| 9,204,189 B1* | 12/2015 | Oztaskent | H04N 21/44224 |
| 9,374,624 B2* | 6/2016 | Randall | H04N 21/4823 |
| 10,341,706 B2* | 7/2019 | Evans | H04N 21/4316 |
| 11,895,174 B2* | 2/2024 | Estus | H04N 21/44222 |
| 2011/0099570 A1* | 4/2011 | Sadja | H04N 7/17309 725/16 |
| 2017/0094345 A1* | 3/2017 | Zerr | H04N 21/43637 |
| 2020/0037025 A1 | 1/2020 | Zerr et al. | |
| 2021/0120289 A1* | 4/2021 | Carney Landow | H04N 21/23614 |
| 2022/0221983 A1* | 7/2022 | Pettit | G06F 16/2428 |
| 2023/0052274 A1* | 2/2023 | Shah | H04N 21/252 |
| 2024/0040207 A1* | 2/2024 | Das | H04H 60/31 |

* cited by examiner

*Primary Examiner* — Nathan J Flynn
*Assistant Examiner* — Christine A Kurien
(74) *Attorney, Agent, or Firm* — Sheridan Ross P.C.

(57) ABSTRACT

A system for real time audience measurement includes a display, an endpoint device coupled to the display, and a central controller configured to generate a first message that flags a channel of interest from among a plurality of channels that provide content for displaying on the display. The central controller is configured to send the first message to the endpoint device to flag the channel of interest at the endpoint device, determine that the display is tuned to the channel of interest, and generate and send viewership data for the channel of interest to a first entity.

20 Claims, 7 Drawing Sheets

DEVICES, SYSTEMS, AND METHODS FOR REAL TIME AUDIENCE MEASUREMENT IN HOSPITALITY ENVIRONMENTS

FIELD

Example embodiments are generally directed to devices, systems, and methods for real time audience measurement in hospitality environments.

BACKGROUND

Revenue from advertisement sales and subsequent insertion of ads into linear content are at least in part predicated on buyers of advertisements having information about viewership to help define the value of an advertisement. Related art viewership measurement in commercial spaces, like hospitality environments with a unified entertainment system, is limited and time consuming, with the reporting of viewership taking minutes to achieve, which complicates determinations of ad value and/or complicates decisions on whether to buy ads in the future (e.g., a spot auction in the immediate future or other purchase later in time).

SUMMARY

Example aspects of the present disclosure include:

A system for real time audience measurement, the system comprising: a display; an endpoint device coupled to the display; and a central controller configured to: generate a first message that flags a channel of interest from among a plurality of channels that provide content for displaying on the display; send the first message to the endpoint device to flag the channel of interest at the endpoint device; determine that the display is tuned to the channel of interest; and generate and send viewership data for the channel of interest to a first entity.

Any of the aspects herein, wherein a first portion of the viewership data comprises a first timestamp that indicates when the display tuned to the channel of interest.

Any of the aspects herein, wherein the central controller is configured to send the first portion of the viewership data to the first entity in response to determining that the display is tuned to the channel of interest.

Any of the aspects herein, wherein a second portion of the viewership data comprises a second timestamp that indicates when the display tunes away from the channel of interest.

Any of the aspects herein, wherein the central controller is configured to send the second portion of the viewership data to the first entity in response to determining that the display is tuned away from the channel of interest.

Any of the aspects herein, wherein the viewership data includes an identifier of the channel of interest.

Any of the aspects herein, wherein the central controller is configured to determine that the display is tuned to the channel of interest in response to detecting the endpoint device has an increased polling rate or in response to receiving a notification from the endpoint device of the increased polling rate.

Any of the aspects herein, wherein the central controller is managed by a second entity different from the first entity.

Any of the aspects herein, wherein the channel of interest is selected by the first entity.

Any of the aspects herein, wherein the endpoint device is configured to update a channel mask for the plurality of channels based on the first message.

Any of the aspects herein, wherein the central controller is configured to provide the channel mask to the endpoint device.

Any of the aspects herein, further comprising: a router configured to reformat messages exchanged between the central controller and the endpoint device.

Any of the aspects herein, wherein the router is configured to: communicate with the endpoint device over a first type of network; and communicate with the central controller and the first entity over a second type of network different than the first type of network.

Any of the aspects herein, wherein the first type of network corresponds to an RF network, and wherein the second type of network corresponds to an IP network.

Any of the aspects herein, wherein the central controller is configured to determine that the display tuned away from the channel of interest in response to detecting a reduction in polling rate or in response to receiving a notification from the endpoint device of the reduction in polling rate.

A method for real time audience measurement, the method comprising: generating, by a central controller, a first message that flags a channel of interest from among a plurality of channels that provide content for displaying on a display; sending, by the central controller, the first message to an endpoint device coupled to the display to flag the channel of interest at the endpoint device; determining that the display is tuned to the channel of interest; and generating and sending, by the central controller, viewership data for the channel of interest to a first entity.

Any of the aspects herein, wherein a first portion of the viewership data comprises a first timestamp that indicates when the display tuned to the channel of interest.

Any of the aspects herein, wherein the first portion of the viewership data is sent to the first entity in response to determining that the display is tuned to the channel of interest.

Any of the aspects herein, wherein a second portion of the viewership data comprises a second timestamp that indicates when the display tunes away from the channel of interest, and wherein the second portion of the viewership data is sent to the first entity in response to determining that the display is tuned away from the channel of interest.

A device for real time audience measurement, the device comprising: a central controller configured to: generate a first message that flags a channel of interest from among a plurality of channels that provide content for displaying on a display; send the first message to an endpoint device to flag the channel of interest at the endpoint device, the endpoint device being coupled to the display; determine that the display is tuned to the channel of interest; and generate and send, in response to determining that the display is tuned to the channel of interest, viewership data for the channel of interest to a first entity.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present disclosure will become apparent to those skilled in the art upon consideration of the embodiment descriptions provided hereinbelow.

Additional features and advantages of embodiments of the present disclosure will become more readily apparent from the following description, particularly when taken together with the company drawings.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Related art advertisement viewership measurement in entertainment systems of hospitality environments, like hotels and hospitals, is limited and time consuming, which may negatively impact interested parties, such as a seller of airtime for ads and/or a buyer of airtime to air an ad, the operator of the hospitality environment, operator of the entertainment system, or other interested entity. One specific technical problem that plagues related art commercial viewership measurement and reporting systems is that measurement and reporting for a particular ad and/or program takes on the order of minutes to inform an interested party of the measured viewership, which may result in lost revenue for the interested party. For instance, entertainment systems of hospitality environments may be managed and controlled by a third party that installs a proprietary entertainment system at the hospitality environment, which enables the operator of the hospitality environment to offer a uniform "look and feel" to customers, among other things. In these environments, the delay in audience measurement and reporting may be caused at least in part due to latencies introduced by the installed hosting architecture.

As may be appreciated, a delay of minutes or more for viewership measurement and reporting may coincide with a window of increased or decreased viewership across the hospitality environment, which can negatively impact revenue for buyers and/or sellers of ads. For example, a minutes-long delay in receiving viewership data may cause a buyer of airtime to miss windows of airtime with increased viewership, resulting in lost exposure of ads to viewers. Meanwhile, a minutes-long delay in receiving viewership data may cause a seller of airtime to miss windows of airtime that were ripe for increased pricing.

Inventive concepts propose to address the above technical problems and other problems in the field by providing real time viewership data to interested parties, for example, within the context of the hospitality industry. If viewership data (e.g., number of viewers at a moment in time) is provided to interested parties in real time (e.g., less than 100 ms), the interested parties can take appropriate action to improve revenue streams and/or increase ad value. In some embodiments, the entertainment system employed by a particular hospitality environment may include special devices that are unique to or useful for controlling and providing content to multiple users (e.g., hotel rooms) in the hospitality environment. Such devices may include a terminal (e.g., a broadband Local Area Network (b-LAN) device) or an internet protocol (IP) client coupled to a display or TV in a hotel room or hospital room. The terminal or IP client knows the channel to which the display is tuned as part of its normal function within the entertainment system. This knowledge enables determination of audience or viewership data that indicates when a particular TV has tuned into and away from a particular channel. This viewership data may be routed to a data aggregation site (e.g., a server or database) that uses the viewership data to generate and provide audience measurement metrics to an ad trafficking system, for example. The ad trafficking system may use the audience measurement metrics for real time development and implementation of ads. Here, it should be appreciated that viewership data is sent to the data aggregation site in a manner that bypasses or avoids some or all of the hosting architecture of the entertainment system that would normally cause the aforementioned delays that plague related art systems, thereby reducing the reporting timeframe from potentially minutes to milliseconds (e.g., less than 100 ms) to meet ad trafficking requirements.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable gate arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Figure 1:
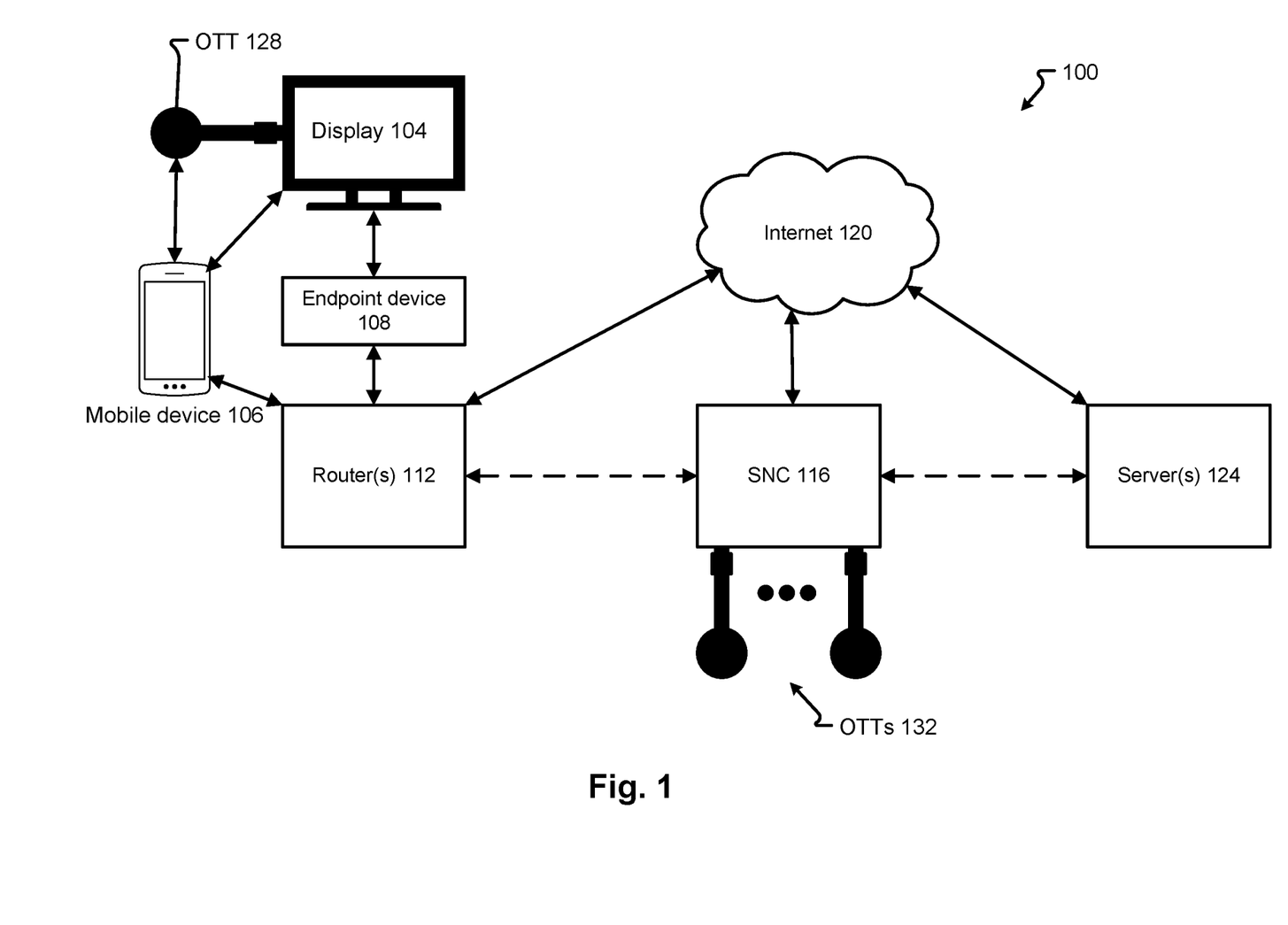
FIG. 1 illustrates a system according to at least one example embodiment.

FIG. 1 illustrates a system 100 according to at least one example embodiment. The system 100 includes a display 104, a mobile device 106, an endpoint device 108, one or more routers 112, a system network controller (SNC) 116, the Internet 120, one or more servers 124, an over the top device (also called an OTT) 128, and/or OTTs 132. The system 100 may provide entertainment services to an environment 200 illustrated in FIG. 2. The environment 200 may correspond to hospitality location (hotel, motel, inn, etc.) or healthcare facility (acute care hospital, clinic, etc.) that includes a plurality of guest or patient rooms A, B, C, etc. and other service related rooms. In this scenario, each guestroom in the environment 200 may include a display 104, a mobile device 106 when occupied by a guest, and an endpoint device 108, as shown for guest room B, for example. A guestroom may further comprise a router 112 in some embodiments. In at least one embodiment, on-site routers 112 are located in service closets or other areas of the environment 200 not easily accessible to guests. Whether OTT 128 is also included in a guestroom may depend on whether the system 100 is implementing a configuration with an OTT 128 in each guestroom or a configuration in which OTTs 132 are shared between multiple guestrooms under control of the SNC 116 (which may enable fewer total OTTs for the environment 200 compared to an OTT 128 in each guestroom).

A display 104 may comprise suitable hardware and/or software and processing capability for reproducing audio and/or video content for consumption by a user. For example, a display 104 may be implemented by a television (LED, LCD, etc.), a computer monitor, a tablet, a projector, and/or other device suitable for reproducing audio and/or video content.

The mobile device 106 may correspond to a user device that has computing and storage capabilities and that is generally mobile in nature. Accordingly, the mobile device 106 may be implemented with a smartphone, a laptop, a tablet, and/or the like.

The endpoint device 108 may comprise suitable hardware and/or software and processing capability for providing a communications interface between a router 112 and the display 104, for storing a channel mask with flags for channels of interest, and/or for detecting that the display 104 is tuned to a channel of interest. In general, the endpoint device 108 operates according to a polling rate that corresponds to a frequency at which the endpoint device 108 checks which channel is currently displayed on the display 104. Upon detecting that the display 104 is tuned to a channel of interest, the endpoint device 108 may increase its polling rate and notify a central controller (e.g., in the SNC 116) of the increased polling rate to trigger sending of viewership data by the central controller to a storage device, such as an off-site server (see the discussion of central controller 404 below). The viewership data sent by the central controller at this point may include a time stamp of when the display 104 tuned to the channel of interest (and/or a time stamp of when the central controller detects or is notified of the increased polling rate). Upon detecting that the display 104 is tuned away from a channel of interest, the endpoint device 108 may decrease its polling rate to a normal rate and notify the central controller of the decreased polling rate which triggers the central controller to send additional viewership data to the storage device, which may include a time stamp of when the display 104 tuned away from the channel of interest (and/or a time stamp of when the central controller detects or is notified of the decreased polling rate). As discussed in more detail below with reference to FIG. 4, an example of an endpoint device 108 includes a broadcast local area network (b-LAN) terminal connected to the display 104 and a router 112 to translate signals routed between the display 104 and the router 112. In another embodiment, the endpoint device 108 may comprise an internet protocol (IP) client that translates signals routed between the display 104 and a router 112. The endpoint device 108 is discussed in more detail below with reference to FIGS. 4 and 5.

Figure 2:
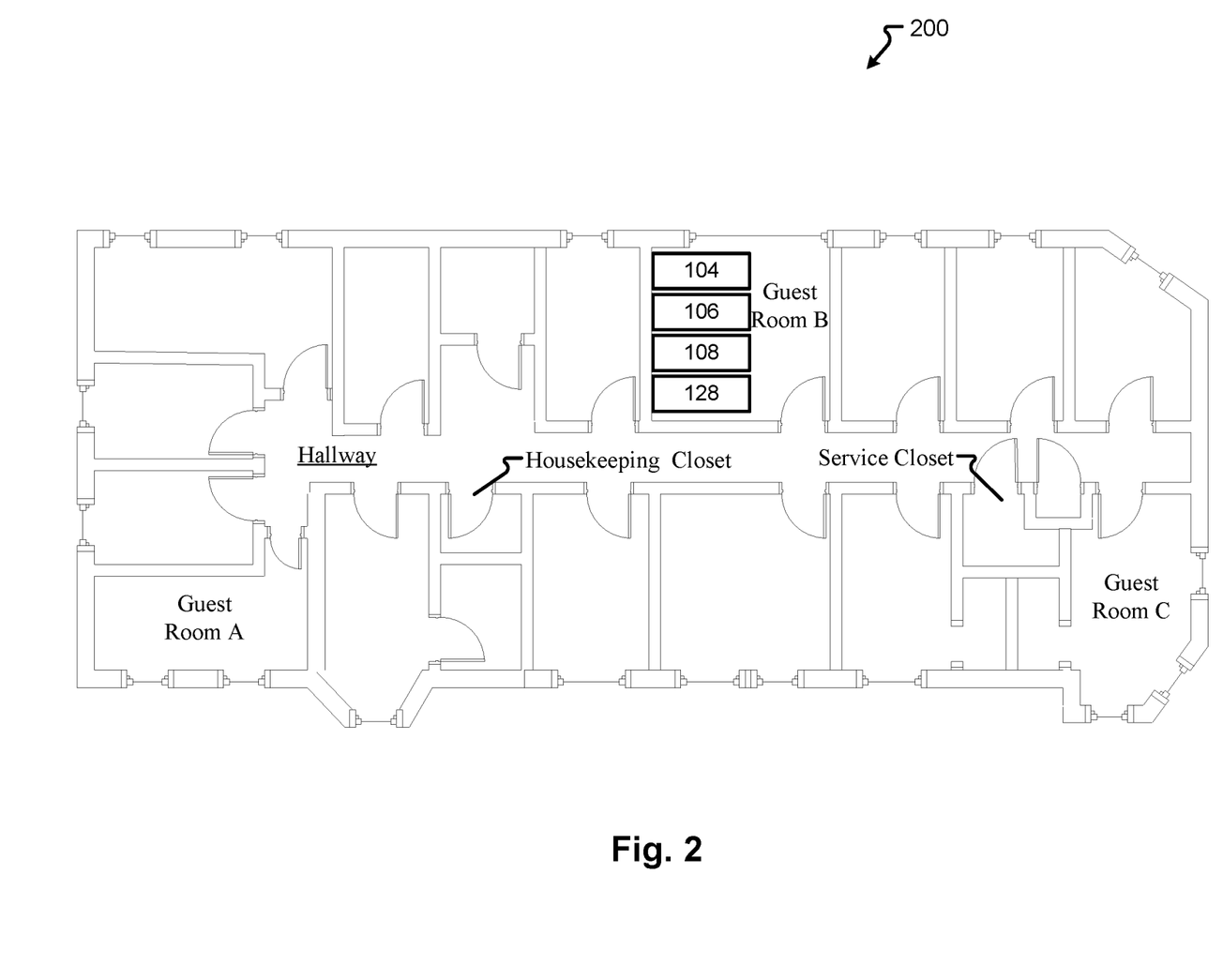
FIG. 2 illustrates an environment for the system in FIG. 1 according to at least one example embodiment.

The one or more routers 112 may comprise suitable hardware and/or software and processing capability for providing communication between the mobile device 106, the endpoint device 108, the internet 120, and/or the SNC 116. A router 112 may be wireless in nature (e.g., a Wi-Fi router) and enable wireless communication between elements of the system 100. Additionally or alternatively, a router 112 may enable wired communication between elements of the system 100 (e.g., a router 112 may comprise an RF router for routing signals encoded with frequency-shift keying (FSK) techniques, a router 112 may comprise a network switch, such as an Ethernet switch, and/or the like). One or more routers 112 may exist within the environment 200 while one or more other routers 112 are remote to the environment 200 to communicate signals over long distances.

The SNC 116 may include suitable hardware and/or software and processing capability for controlling various functions within the system 100. In one embodiment, the SNC 116 provides and controls access to entertainment options for users within the system 100. Such entertainment options include but are not limited to viewing of live television programming, video on demand, room service, video games, and/or the like, all of which may be presented on a display 104. Thus, the SNC 116 may be installed and/or controlled by an entity that enables the entertainment options and controls user access to such options (see FIG. 3). In one example, the SNC 116 may comprise a server or a collection of servers. Additionally or alternatively, the SNC 116 may comprise one or more network switches (e.g., Ethernet switches) to route signals between router(s) 112, the Internet 120, and/or server(s) 124. As discussed in more detail below, an SNC 116 may comprise or be in communication with a central controller that controls functions related to monitoring and/or reporting advertisement viewership.

The SNC 116 can include or have access to content, such as stored movies, videos, menu screens, animations, audio content and the like. The SNC 116 may access content through a third party content provider (e.g., through a streaming application). In addition, the SNC 116 includes one or more processors for executing instructions implementing features of the supported systems, video encoders or cards, and a connection to a property content distribution network. The content distribution network interconnects the SNC 116 to the displays 104 or other output devices throughout the hospitality facility (e.g., in the guest rooms) and may comprise router(s) 112, endpoint devices 108, and/or mobile devices 106.

The one or more servers 124 may comprise suitable hardware and/or software and processing capability for controlling various functions within the system 100. In one embodiment, the one or more servers 124 have the same or similar components as the SNC 116. For example, a server 124 may comprise an application server that runs and/or provides application data to an application on mobile device 106 that is associated with the same entity that controls the SNC 116. In an embodiment according to FIG. 3, such an application enables pairing of a mobile device 106 to the SNC 116 to enable the mobile device 106 with certain controls of the display 104. Further, the servers 124 may comprise a server operated by a content provider (e.g., NETFLIX) that provides end-user audio and/or video content to the display 104, for example, with assistance from an OTT 128 or 132 having the content provider's application stored thereon. The servers 124 may correspond to a data aggregation site that comprises a database or server that receives and stores viewership data for advertisement viewing within the system 100. More or fewer servers 124 may be included depending on implementation of the system 100.

The OTTs 128 and 132 may include suitable hardware and/or software for providing a common user interface at the display 104 from which a user can select and consume content through a display 104. In one embodiment, an OTT 128, 132 corresponds to a GOOGLE CHROMECAST device, an APPLE TV device, an AMAZON FIRESTICK device, and/or the like. The SNC 116 may pair the mobile device 106 with a particular guestroom to provide that specific mobile device 104 or guestroom access to entertainment options (see, for example, US Publication No. 2020/0037025 to Zerr et al., filed on Jul. 26, 2019, the entire contents of which are incorporated by reference herein).

The system 100 may be deployed in various configurations. In general, an environment 200 includes the display 104, an endpoint device 108, router(s) 112, mobile device 106, and optionally, an OTT 128. The SNC 116, however, may be local or remote to the environment 200. For example, in one configuration, the SNC 116 is deployed remotely from the environment 200 so that the SNC 116 may remotely control multiple environments 200 from a single location (e.g., in accordance with suitable cloud computing technologies). Here, troubleshooting and maintenance of a remotely located SNC 116 can occur at the single, remote location of the SNC 116. In another configuration, the SNC 116 is deployed local to the environment 200, such as within a service closet of the environment 200 or some other suitable location near or on-site the environment 200. In this case, an SNC 116 may be located at each one of multiple environments 200. In yet another example, an SNC 116 may have some components located local to the environment 200 and some components located remote to the environment 200. The above described configurations of the SNC 116 may also apply to the router(s) 112 and/or the server(s) 124 depending on design of the system 100.

Communication between elements of the system 100 may also have various configurations. For example, the router(s) 112, SNC 116, and/or server(s) 124 may communicate with one another over a closed or private network that does not involve the internet such as a LAN (local area network) or WAN (wide area network) connection (see dashed lines in FIG. 1). In other embodiments, the internet 120 facilitates communication between the routers 112, SNC 116, and/or the server(s) 124.

It should be appreciated that the elements of the system 100 and environment 200 are shown for the sake of explanation and that more or fewer elements may be included. In addition, one or more elements of the system 100 may be integrated with one or more other elements of the system 100. For example, the SNC 116 and an application server within servers 124 that is controlled by the same entity as the SNC 116 may be integrated with one another.

It should further be appreciated that various elements in FIG. 1 (e.g., items 104, 106, 108, 112, 116, 124) and other figures may be implemented with or include suitable processing circuitry. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry 128.

In addition, although not explicitly shown, it should be appreciated that the elements in FIG. 1 include one or more communication interfaces for facilitating wired and/or wireless communication between one another and other unillustrated elements of the system 100.

Figure 3:
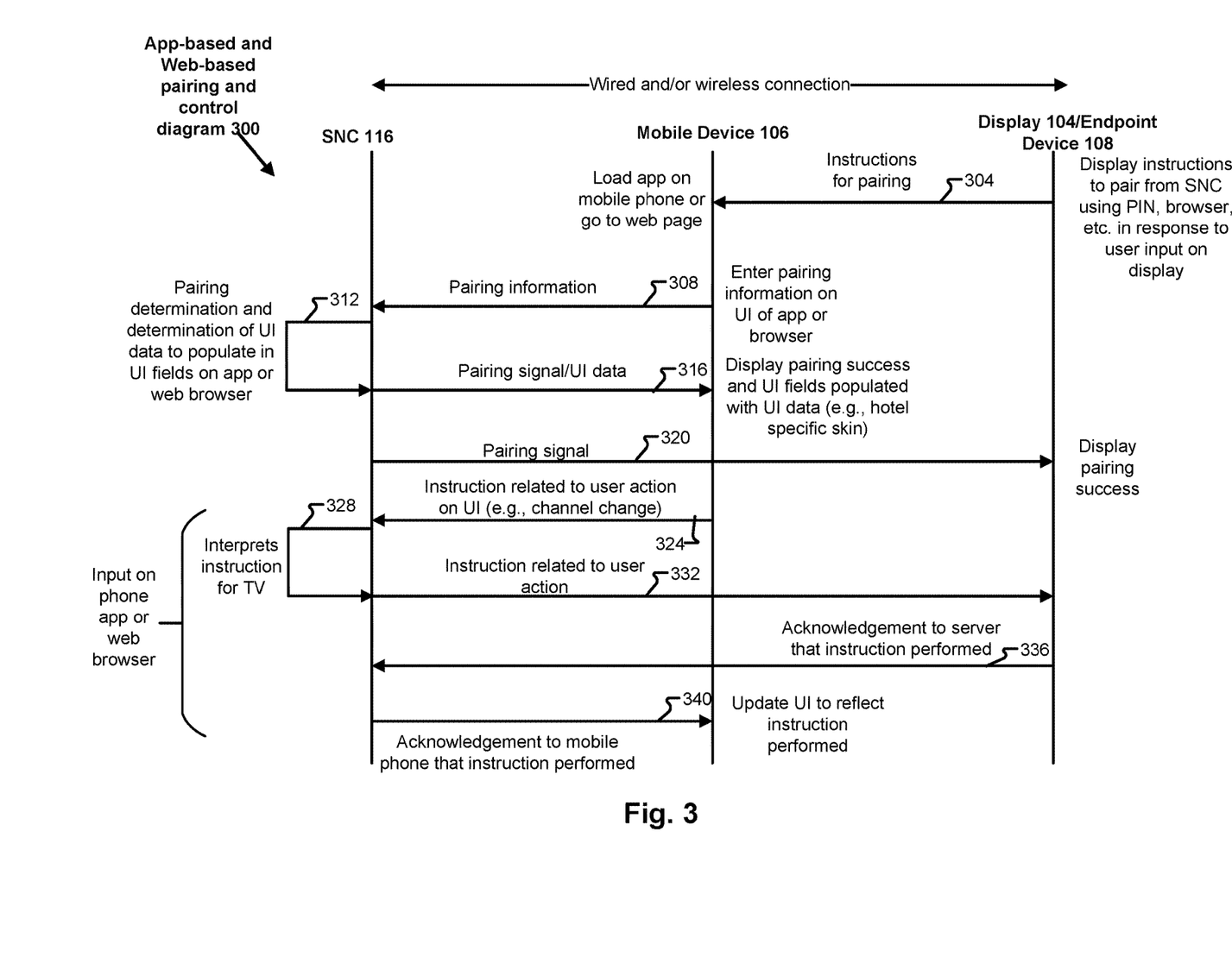
FIG. 3 illustrates a diagram for the system in FIG. 1 according to at least one example embodiment.

FIG. 3 illustrates a diagram 300 for the system 100 in FIG. 1 according to at least one example embodiment. Each operation in diagram 300 may be carried out with one or more suitable messages or signals sent over a wired and/or wireless connection.

As described herein, the system 100 is a multi-user interactive system. In general, the system 100 is used in connection with the delivery of video and/or audio signals to televisions or other output devices in rooms of the environment 200. The environment 200 generally includes or is in communication with a host computer or server, such as the SNC 116, that performs various functions, including implementing and providing features and components related to entertainment. FIG. 3 illustrates various operations and/or messages exchanged to accomplish a pairing between an SNC 116 and a mobile device 106 which enables the user of the mobile device 106 control functionality on the display 104 and/or on an OTT 128/132.

The diagram 300 covers both application-based pairing and control through a mobile device application and web-based pairing and control through a uniform resource locator (URL) of a web browser. The below example scenario omits an explicit illustration of other elements of the system 100 for the sake of simple explanation, but one of ordinary skill in the art can appreciate the roles of these unillustrated elements. As shown, communication between elements may be over wireless and/or wired connections (e.g., CATV cable, Ethernet cable, Wi-Fi, etc.).

In operation 304, a display 104 displays instructions for pairing the mobile device 106 to the display 104 through the SNC 116. The instructions may be displayed in response to user input through a remote control of the display 104. In this example, the instructions may include a series of steps that a user of the mobile device 106 performs in order to complete the pairing process. For example, the instructions may direct the user to download and open a specific mobile application on the mobile device 106 or to open a web browser and visit a specific URL. The instructions may further include directing the user to enter a unique pairing code that is generated or assigned by the SNC 116 to identify an address or port to which the display 104 is connected. The pairing code may be sent to the display 104 from the SNC 116 in response to the user input through a remote control of the display 104, and may be displayed. The communications between each element in the messaging diagram 300 may be encrypted as desired. Here it should be appreciated that pairing the mobile device 106 to the display 104 may include pairing the mobile device 106 to the display 104 itself, a set top box connected to the display 104, an endpoint device 108 connected to the display 104, and/or another suitable device in the guestroom that enables the mobile device 106 to control the display 104 or other device in the guestroom.

Other possible examples for the mobile device 106 obtaining the pairing code include scanning a bar code, QR code, or other machine readable code displayed by the display 104, or otherwise communicating the pairing code supplied by the SNC 116 to the mobile device 106. In one embodiment, the mobile device 106 may be paired with the guestroom upon the mobile device 106 connecting to a guest wireless (e.g., Wi-Fi) network. In this case, the guest internet system is alerted when the mobile device 106 connects to the network, determines that the mobile device 106 is associated with a particular guestroom through a property management system of the environment 200 (e.g., with a last name and room number entered when connecting to the network), and then sends a notification to the SNC 116 that the mobile device 106 is authorized to control the display 104 and/or other devices in the guestroom.

In operation 308, the mobile device 106 sends pairing information to the SNC 116. The pairing information includes the pairing code displayed on the display 104 in operation 304 and entered on the mobile device 106.

In operation 312, the SNC 116 makes a pairing determination and a determination of which user interface (UI) data to populate in UI fields on the mobile device 106 using the pairing information. For example, the SNC 116 determines whether the pairing code received from the mobile device 106 matches a pairing code stored at or accessible by the SNC 116, and if a match exists, the SNC 116 stores (e.g., temporarily stores) an association between that particular mobile device 106 and the address or port identified by the pairing information from operation 308. This association indicates to the SNC 116 that signals from the mobile device 106 to control the display 104 and/or content provided to the display 104 should be routed to the address or port to which the display 104 is connected, and vice-versa. In addition, the SNC 116 may use the known address or port to which the pairing code was provided by the SNC 116 to identify the property at which the display 104 is located in order to determine the UI data that should populate UI fields of the application or web browser at the mobile device 106.

In operation 316, the SNC 116 sends a pairing signal to pair the mobile device 106 with the SNC 116 and to populate UI data in the appropriate UI fields on the mobile device 106. The UI of the mobile device 106 displays a notice that the pairing was a success and displays a UI with UI fields populated by the UI data determined in operation 312. For example, if the property is a hotel, the UI data populates the UI fields such that the mobile device 106 displays a hotel-specific skin (e.g., the hotel logo and other predetermined UI fields that the hotel would like populated). The UI of the application or web browser at the mobile device 106 may be preprogrammed to appear with certain default UI data in certain default UI fields prior to pairing, and then upon successful pairing, additional UI fields may be populated according to UI data included with the signal or message received in operation 316. That is, the mobile device 106 application or web browser may be preprogrammed with a number of possible preexisting UI fields, and the signal or message received by the mobile device 106 in operation 316 populates (or depopulates) a number of the possible preexisting UI fields so that the mobile device 106 displays a UI that is tailored to the property.

In operation 320, the SNC 116 sends the pairing signal or message to the address or port associated with the pairing, which causes the display 104 to display an indication of pairing success with the mobile device 106.

At this stage, the SNC 116 is ready to accept control signals from the mobile device 106 and to apply those signals in operations that can include controlling the content displayed by the display 104 and certain operating parameters of the display 104, such as the volume of audio output by the display 104. In addition, signals related to the playback of the content or other information can be provided from the SNC 116 to the mobile device 106.

Operations 324 to 340 relate to the system responding to user input on mobile device 106 application or on a browser running on the user mobile device.

In operation 324, the mobile device 106 sends an instruction related to user action on the application or web browser at the mobile device 106. For example, the user of the mobile device 106 activates the UI element on the application that indicates the user desired to change a channel on the display 104.

In operation 328, the SNC 116 receives the instruction related to the user action.

In operation 332, the SNC 116 sends an instruction to the display 104 that instructs the display 104 to respond in a manner consistent with the user action on the application or web browser at the mobile device 106. The instruction may be received and interpreted by the endpoint device 108 which causes the display 104 to respond accordingly.

In operation 336, the display 104 sends an acknowledgement to the SNC 116 that the instruction received in operation 332 has been performed.

In operation 340, the SNC 116 sends an acknowledgement to the mobile device 106 that the display 104 performed the action desired by the user (e.g., the channel change). Operation 340 may cause the application on the mobile device 106 to update the mobile device 106 UI to reflect the action performed on the display 104 with one or more indications. In the channel change example, operation 340 may cause the indication of a channel change (or other indications) on the mobile device 106 to notify the user that the display 104 performed the channel change.

In addition, the playback of content by the display 104 can be controlled by the mobile device 106. These operations can be continued until the mobile device 106 unpairs from the system or until the pairing relationship is otherwise terminated.

As may be appreciated, FIG. 3 relates to pairing a mobile device 106 with an SNC 116 to enable the mobile device 106 and upon pairing, the mobile device 106 controlling one or more aspects of a specific display 104. The same or similar concepts may be used to pair a mobile device 106 to an OTT 128 or 132, which enables streaming and control of content to the display 104 through the paired OTT. In one embodiment, successful pairing of a mobile device 106 to control a display 104 simultaneously enables control of an OTT. In addition, other suitable pairing methods may be performed that authorize a particular mobile device 106 to control a particular display 104 and/or OTT.

Figure 4:
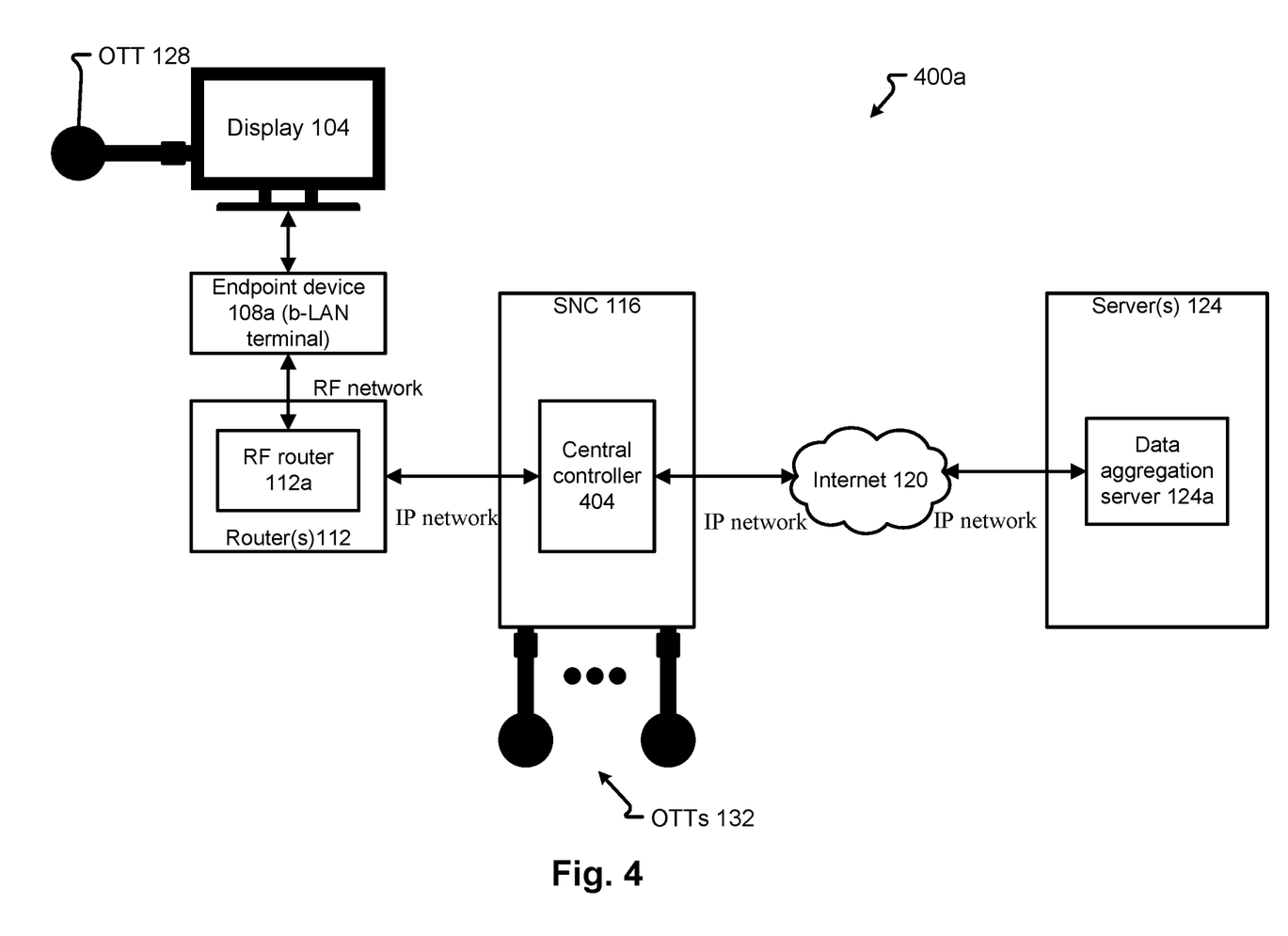
FIG. 4 illustrates a variation of the system in FIG. 1 according to at least one example embodiment.

FIG. 4 illustrates a variation of the system 100 in FIG. 1 as a system 400a according to at least one example embodiment. More specifically, FIG. 4 illustrates an example where an endpoint device 108a is implemented with a b-LAN terminal. In general, a b-LAN terminal is a device used in hospitality environments and includes suitable hardware and/or software to facilitate customer access to entertainment options like live television, video on demand, and the like. The b-LAN terminal may be integrated with the display 104 or comprise a set top box (STB) that is separate from but connected to the display 104. In a scenario where the endpoint device 108a comprises a b-LAN terminal, at least one router 112 may correspond to a radio frequency (RF) router (or RF modem) 112a that communicates over a suitable network, such as an RF network that employs frequency-shift keying FSK or other suitable RF technology. The RF network may be implemented with suitable hardware, such as coaxial cabling and amplifiers positioned throughout the network.

The system 400a further includes a central controller 404 and an RF router 112a. The RF router 112a may reformat messages exchanged between the central controller 404 and the endpoint device 108 so that messages destined for the central controller 404 are in a format that can be processed by the central controller 404 while messages destined for the endpoint device 108a are in a format that can be processed by the endpoint device 108a.

As shown in FIG. 4, the RF network may form at least part of the communication path between the endpoint device 108a and the central controller 404 of the SNC 116 while an IP network may form another part of the communication path. For example, the endpoint device 108a communicates with the router 112a over an RF network while the router 112a communicates with the central controller 404 over an IP network. As such, the RF router 112a may reformat RF messages as IP messages and reformat IP messages as RF messages. In accordance with example embodiments, the central controller 404 may include suitable hardware and/or software for executing functions related to producing viewership data for advertisements displayed on the display 104. Although the central controller 404 is shows as being integrated with the SNC 116, the central controller 404 may be disaggregated from the SNC 116 and exist as a physically separate entity that may still be in communication with the SNC 116. In one embodiment, for example, the SNC 116 is remote to the environment 200 while the central controller 404 comprises components that are local to the environment 200 to reduce latency in reporting viewership data. In this case, the central controller 404 may be dedicated to reporting viewership data while the SNC 116 handles some or all other tasks for providing entertainment services in the environment 200.

As also shown, the central controller 404 may communicate with an entity, such as a data aggregation server 124a of the one or more servers 124, over an IP network using suitable internet protocols (e.g., protocols for IPv4, IPv6, etc.). The data aggregation server 124a may include suitable hardware and/or software to store and/or process viewership data received from the central controller 404. The central controller 404 may include the same or similar processing circuitry and memory as that described above. In one embodiment, the data aggregation server 124a belongs to a same entity that controls the central controller 404. In another embodiment, the data aggregation server 124a belongs to an entity different from the entity that controls the central controller 404. For example, the central controller 404 may belong to and be controlled by an entity that provides the framework for entertainment services in environment 200 while the data aggregation server 124a may belong to or be accessible by a third-party entity, such as an ad trafficker or buyer of advertisements that appear on displays 104 in the environment 200. In other embodiments, the data aggregation server 124a is accessible by multiple entities interested in viewership data produced in accordance with example embodiments. These entities may include the owner/operator of the environment 200, the owner/operator of the central controller 404, a buyer of advertisements, a seller of advertisements, and/or other entities that could benefit from knowledge of viewership data for advertisements shown on displays 104 within the environment 200.

Figure 5:
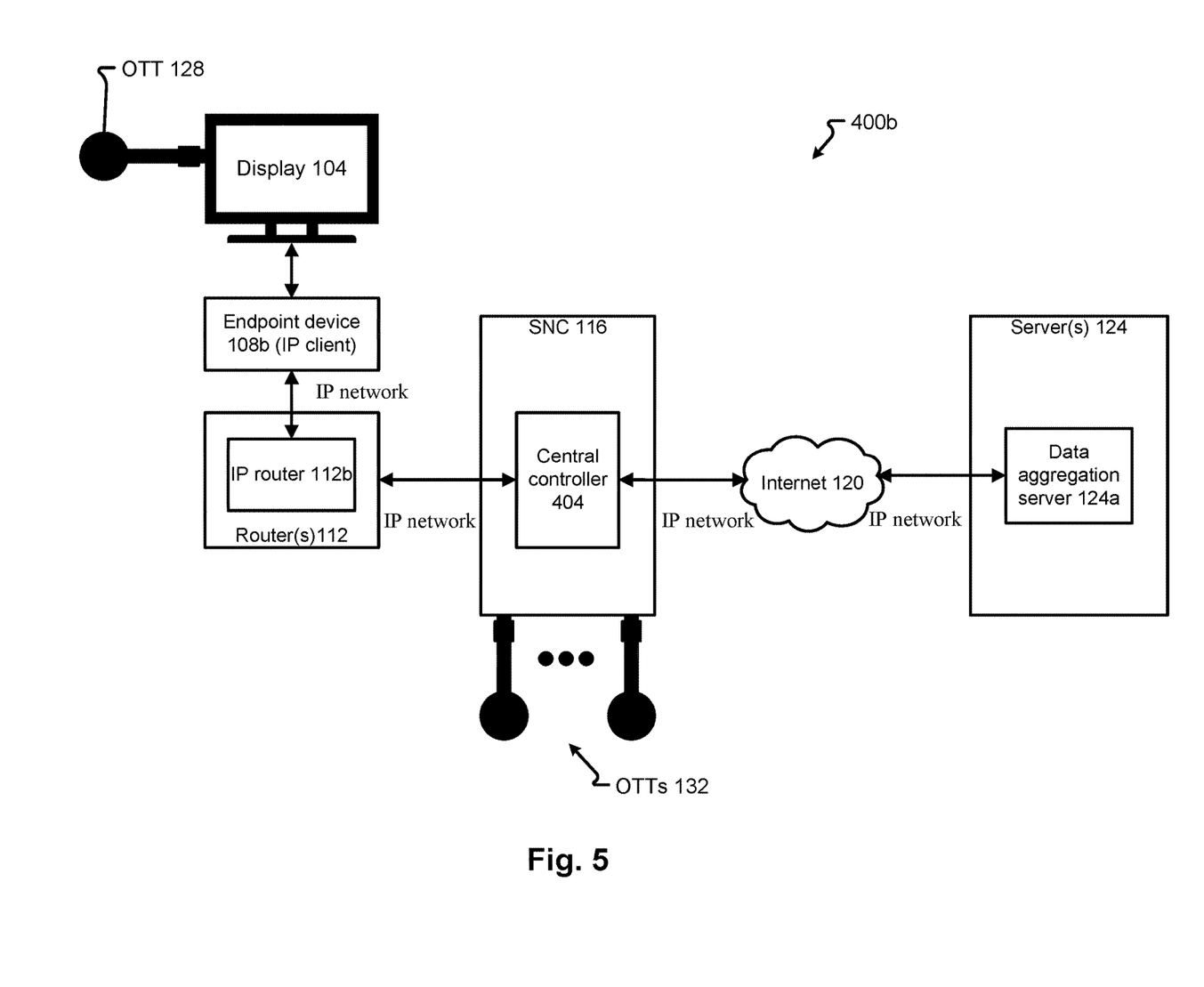
FIG. 5 illustrates a variation of the system in FIG. 1 according to at least one example embodiment.

FIG. 5 illustrates a variation of the system 100 in FIG. 1 as a system 400b according to at least one example embodiment. The system 400b is the same as the system 400a except that the endpoint device 108b comprises an IP client instead of a b-LAN terminal and the router(s) 112 comprise an IP router 112b so that the communication from the endpoint device 108b to central controller 404 is over an IP network. The central controller 404 and data aggregation server 124a operate in the same or similar manner as that described above and below (with the exception that the central controller 404 is equipped to handle IP traffic to/from the endpoint device 108b, whereas the central controller 404 in system 400a may handle RF traffic and, in some cases, also IP traffic). An IP network may be implemented with suitable hardware, such as Ethernet cables, Wi-Fi routers, and/or the like.

With reference to FIGS. 4 and 5, it should be appreciated that multiple endpoint devices 108a within the environment 200 may utilize a single RF router 112a while multiple endpoint devices 108b within the environment 200 may utilize a single IP router 112b.

Figure 6:
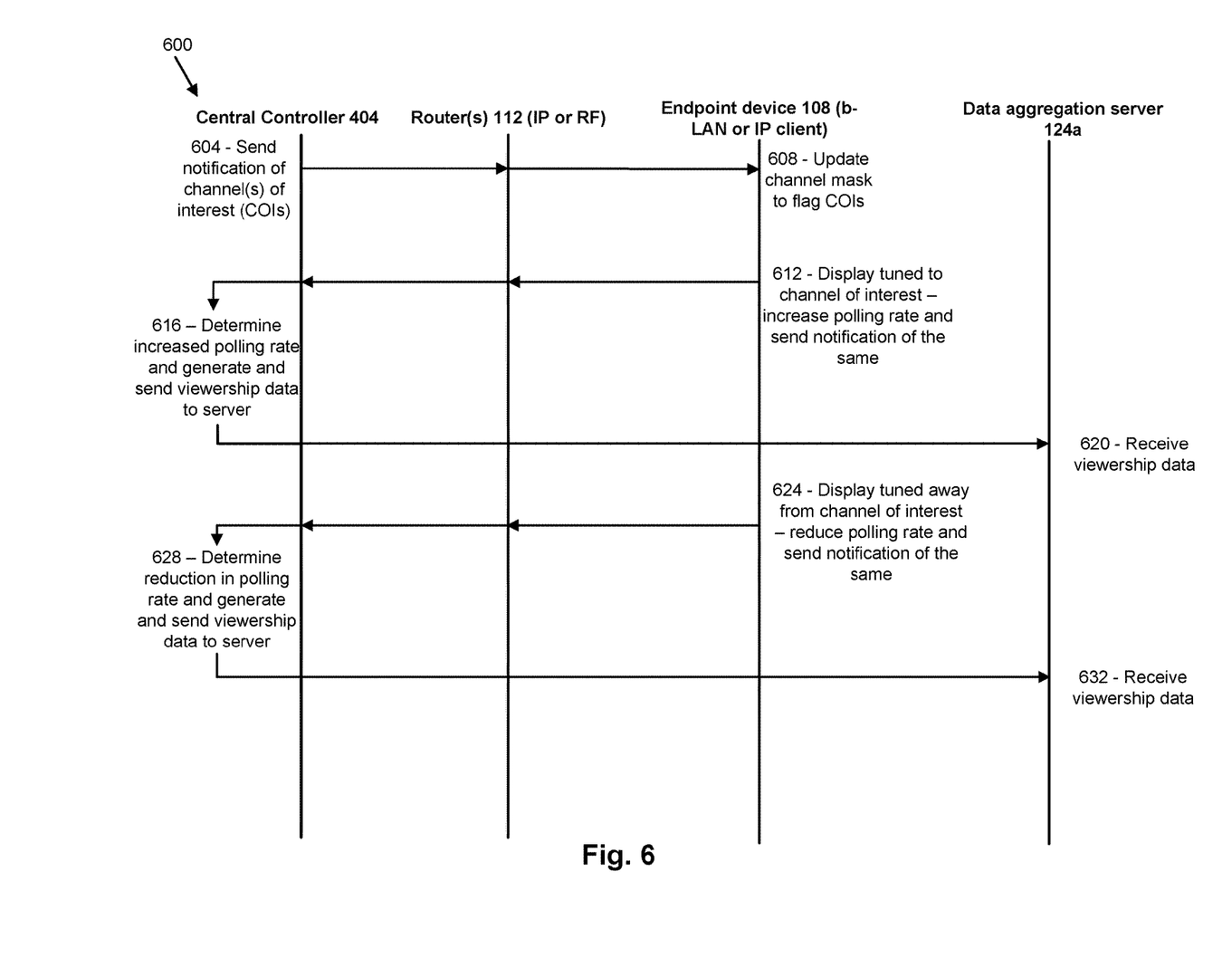
FIG. 6 illustrates a diagram for the systems in FIGS. 4 and 5 according to at least one example embodiment.

FIG. 6 illustrates a diagram 600 for the systems 400a and 400b according to at least one example embodiment. Each operation in diagram 600 may be carried out with one or more suitable messages or signals sent over a wired and/or wireless connection. FIG. 6 relates to operations for real-time or near real-time audience advertisement measurement that includes producing viewership data for storage and/or processing at data aggregation server 124a. As described herein, related art methods of reporting viewership data in hospitality environments may suffer from latencies introduced by the architecture of the entertainment system, which adversely impacts the ability of ad traffickers to efficiently fill advertisement slots.

In operation 604, the central controller 404 sends configuration information as a message to endpoint device 108 that identifies one or more channels of interest from among a plurality of channels that provide content for displaying on a display 104. The plurality of channels may comprise traditional linear television channels from a cable or satellite television provider. The plurality of channels may also include other channels "on top of" the traditional channels, such as one or more channels that are added by the owner/operator of the environment 200. The channels of interest may be identified by a party or entity interested in tracking audience viewership (e.g., an ad trafficker). Thus, although not explicitly shown, the central controller 404 may add flags to the channels of interest in response to receiving configuration information from the interested party (e.g., via the data aggregation server) that indicates which channels are of interest. Additionally or alternatively, the central controller 404 may preprogram flags for one or more channels of interest and/or the flags may be made apparent to the central controller 404 through other suitable methods.

In operation 608, the endpoint device 108 updates its channel mask and adds a flag to each channel of interest in accordance with the notification generated and sent in operation 604. In general, a channel mask may correspond to a listing of channels stored at the endpoint device 108 which are authorized for viewing on a particular display 104. In this way, the endpoint device 108 uses the channel mask to control which channels are viewable and not viewable at a particular display 104 (some guests or users may have different channel privileges than others). After operation 608, the endpoint device 108 has an updated channel mask that includes flags for channels of interest. Table 1 below shows an example of a channel list of all channels that are present, a channel mask that indicates which channels are available to a particular display 104 or guestroom (marked with an "X"), and a flag to indicate whether the channel is of interest (channels flagged with ones are channels of interest and channels flagged with zeros are not of interest). The endpoint device 108 may store Table 1 (or other similar table) in local memory. In Table 1 below, a $3^{rd}$ party channel may correspond to a cable and/or satellite TV channel, an OtherTheAir channel may correspond to an antenna-tuned channel (e.g., from a roof antenna), an OTT delivered channel may correspond to a channel delivered by a streaming service, a property owner/operator channel may correspond to a channel added by the owner/operator of environment 200 (such a channel may be added by a hotel and may be a default channel added to the channel mask or a dedicated temporary channel for a wedding or convention at the hotel), and a system operator channel may be a channel added by the installer/manager of the system that provides entertainment services for the environment 200.

TABLE 1

| Master Channel List | Channel Mask | Channel of Interest (1-yes, 0-no) |
| --- | --- | --- |
| 2 - $3^{rd}$ Party Linear Channel | X | 1 |
| 3 - $3^{rd}$ Party Linear Channel | X | 0 |
| 4 - OverTheAir Channel | X | 1 |
| 5 - OTT Delivered | X | 1 |
| 6 - Property Owner/Operator | X | 1 |
| 7 - Property Owner/Operator |  | 0 |
| 8 - System Operator | X | 1 |

Operation 612 occurs when the display 104 is tuned to a channel of interest. For example, the endpoint device 108 determines that a channel is of interest by consulting the flags Table 1 and determining that a channel is of interest (flag is 1) or not of interest (flag is 0). Upon determining that the display 104 has tuned to a channel of interest, the endpoint device 108 automatically increases its polling rate from a normal polling rate for channels not of interest to an increased polling rate for channels of interest. As noted above, the polling rate corresponds to a frequency at which the endpoint device 108 checks which channel is tuned on the display 104. A normal polling rate may correspond to about 60 times per second while an increased polling rate may be 200 to 300 times per second. However, example embodiments are not limited thereto, and other normal and increased polling rates may be used. As may be appreciated, increasing the polling rate of the endpoint device when tuned to a channel of interest contributes to the "real-time" ability of the system to report viewership data. For channels not of interest, nothing further occurs and the method ends at operation 608. In one example, the signal or message sent in operation 604 to the endpoint device 108 also provides information on the value of the polling rate that the endpoint device 108 should use as the increased polling rate (e.g., an instruction to increase the polling rate to 200 times per second). In other embodiments, the endpoint device 108 has a fixed or pre-programmed increased polling rate that is automatically activated employed upon detecting that the display 104 is tuned to the a channel of interest.

Operation 612 may further include the endpoint device 108 sending a notification as a signal or message to the central controller 404 that the polling rate has increased, thereby indicating that the display is tuned to a channel of interest and to trigger sending of viewership data to the server 124a in operation 616.

Operation 616 includes the central controller 404 determining that the endpoint device 108 has an increased polling rate and generating and sending a first portion of viewership data to the data aggregation server 124a. In at least one embodiment, operation 616 includes the central controller 404 detecting that the endpoint device 108 has increased its polling rate without receiving such a notification from the endpoint device 108. For example, the central controller 404 may periodically poll the endpoint device 108 about whether the polling rate has increased. It should be appreciated that operation 616 may occur substantially simultaneously at the central controller 404 in response to determining that the endpoint device 108 has an increased polling rate (e.g., through a notification received from the endpoint device or through detection by the central controller 404). The first portion of the viewership data may comprise a timestamp of when the display 104 tuned to the channel of interest and an identifier that identifies the channel of interest. The timestamp may be generated at the central controller 404 upon determining that the endpoint device 108 has an increased polling rate. Alternatively, the timestamp may be generated by the endpoint device 108 when the display tunes to the channel of interest in operation 612. In this case, the timestamp generated by the endpoint device 108 is passed through the central controller 404 as the first portion of viewership data. In at least one embodiment, the first portion of the viewership data may further comprise an address to indicate that the channel of interest is being viewed in a particular room and/or at a particular environment 200. The address may be added to the first portion of the viewership data at the central controller or the endpoint device 108. The address may comprise a media access control (MAC) address of the endpoint device 108, an identifier unique to the environment 200 among other environments 200, or other suitable identifier to identify either the specific display 104 and/or the specific environment 200.

In operation 620, the data aggregation server 124a receives the first portion of the viewership data and now has information on when and where the channel of interest was tuned to on the display 104 via the timestamp and address included in the first portion of the viewership data. Here, it should be appreciated that the viewership data reported in operation 616 is accomplished in real time or near real time. In one embodiment, it takes less than 100 ms from the time the display 104 is tuned to a channel of interest in operation 612 to the time the data aggregation server 124a receives the first portion of the viewership data.

In operation 624, the display 104 tunes away from the channel of interest, which triggers the endpoint device 108 to reduce its polling rate from the increased polling rate back to a normal polling rate (e.g., a reduction from 200 times per second to 60 times per second). In at least one embodiment, operation 624 includes the endpoint device 108 generating and sending a message to the central controller 404 with an indication that the polling rate is reduced (i.e., the channel of interest has been tuned away from). Alternatively, the central controller 404 detects that the reduction in polling rate by, for example, periodically polling the endpoint device 108 about whether the polling rate has increased.

In operation 628, the central controller 404 determines that the endpoint device 108 has experienced a reduction in polling rate (e.g., by receiving the indication from the endpoint device 108 or detecting the reduction itself). In response, the central controller 404 generates and sends a second portion of viewership data to the data aggregation server 124a. The second portion of the viewership data may include a timestamp of when the display 104 tuned away from the channel of interest and an identifier that identifies the channel of interest. The timestamp in the second portion of the viewership data may be generated in the same or similar fashion as that described for the first portion of the viewership data. The second portion of the viewership data may further include the same address as the first portion of the viewership data.

In operation 632, the data aggregation server 124a receives the second portion of the viewership data and now has information on when the channel of interest was tuned away from on the display 104 via the timestamp and the address included with the second portion of the viewership data. Here, it should be appreciated that the viewership data reported in operation 628 is accomplished in real time or near real time. In one embodiment, it takes less than 100 ms from the time the display 104 is tuned away from a channel of interest in operation 624 to the time the data aggregation server 124a receives the second portion of the viewership data in operation 632. Thereafter, the method ends.

In view of the above, it should be appreciated that upon receiving the second portion of the viewership data in operation 632, the data aggregation server 124a now has a complete set of viewership data that indicates where and how long a channel of interest was viewed. Interested parties (e.g., ad traffickers) may analyze or use the viewership data for any suitable purpose, such as determining when to air or not air a particular ad and/or gathering precise viewership statistics to help make these determinations. Viewership statistics may include but are not limited to how many displays 104 were tuned to the channel of interest when an ad started, changes in viewership during ad play, percentage of ad content that played before the display was tuned away from the channel of interest, and/or the like, some or all of which help establish/calculate of the value of the ad play (e.g., cost per thousand (CPM) value). Additionally, viewership statistics may inform on ad effectiveness by tracking the time of day, calendar day, geographic location (e.g., designated market area (DMA)), brand-flag, property characteristics (luxury, roadside business, budget, gaming), and/or the like. All the above help establish the ad value, how to target specific ads, clientele type, and/or the like. In at least one embodiment, an interested party may take action in real time or near real time based on the viewership data. For example, the data aggregation server 124a may determine, from the first portion of viewership data, that the number of guestrooms or guests currently watching a channel of interest exceeds a threshold number, which may automatically trigger one or more other operations, such as automatically airing a particular ad or ads for all displays 104 currently tuned to the channel of interest. Additionally or alternatively, exceeding the threshold number may trigger automatic pushing of a particular ad or ads to mobile devices 106 determined to belong to users watching the channel of interest.

Figure 7:
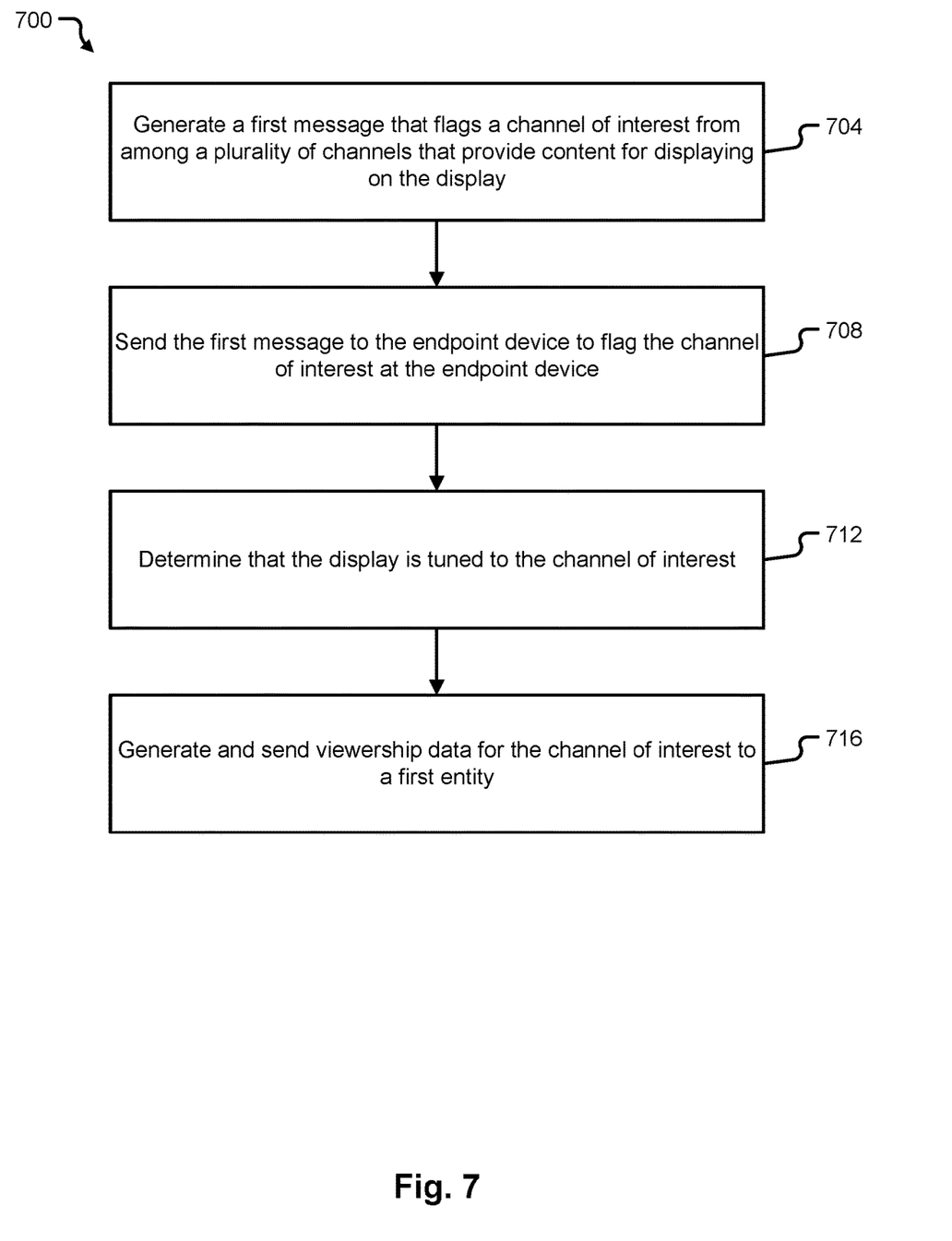
FIG. 7 illustrates a method according to at least one example embodiment.

FIG. 7 illustrates a method 700 according to at least one example embodiment. The method 700 relates to generating and reporting viewership data in real time or near real time and may be carried out by one or more elements of the systems described herein, such as the central controller 404. Accordingly, the method 700 is described with reference to FIGS. 1-6.

Operation 704 includes generating, for example, by the central controller 404, a first message that flags a channel of interest from among a plurality of channels that provide content for displaying on a display 104. Operation 708 includes sending the first message to an endpoint device 108 to flag the channel of interest at the endpoint device 108. Thereafter, the endpoint device 108 updates a channel mask for the plurality of channels based on the first message, for example, by adding a flag to the channels of interest. Operations 704 and 708 may correspond to operations 604 and 608 in FIG. 6.

Operation 712 includes determining that the display 104 is tuned to the channel of interest (see also, operations 612 and 616). For example, the central controller 404 may receive an indication that the display 104 is tuned to a channel of interest from the endpoint device 108. Alternatively, the central controller 404 may detect that the display 104 is tuned to the channel of interest.

Operation 716 includes the central controller 404 generating and sending viewership data for the channel of interest to a first entity for further processing. The first entity may correspond an interested party, such as an ad trafficking company. The viewership may be sent to a data aggregation server 124a managed by the first entity. Meanwhile, the viewership data may include different portions sent at different points in time. For example, as described above with reference to FIG. 6 in operation 616, a first portion of the viewership data comprises a first timestamp that indicates when the display 104 tuned to the channel of interest. The central controller 404 may send the first portion of the viewership data to the first entity in response to being notified or determining that that the display 104 tuned to the channel of interest (e.g., in response to the central controller 404 being notified of or detecting an increase in polling rate at the endpoint device 108). As further described above in operation 628, a second portion of the viewership data may comprise a second timestamp that indicates when the display 104 tunes away from the channel of interest. The central controller 404 is configured to send the second portion of the viewership data to the first entity in response to the display 104 being tuned away from the channel of interest (e.g., in response to the central controller 404 detecting or being notified of a reduction in polling rate at the endpoint device 108). The first and second portions of viewership data may include an identifier of the channel of interest so that the first entity can associate the viewership data to a particular channel of interest.

In at least one embodiment, the central controller 404 is managed by a second entity different from the first entity. In a scenario where the first entity is an ad trafficking company, the second entity may be an operator of the system(s) described herein that provide entertainment services in the environment 200. The second entity may install, manage, and maintain components of the systems that provide the entertainment services, which may vary according to the type of environment 200 (a hospital, a hotel, a casino hotel, etc.). The channel(s) of interest may be selected by a suitable interested party, such as the operator of the entertainment system, the operator of the environment 200, and/or an ad trafficking company.

Example embodiments are shown and described with respect to sending messages between elements of the systems here. It should be appreciated that the term "message" as used herein generally includes one or more electrical signals traveling over a wired network (e.g., coax, optical, and/or the like) and/or one or more electromagnetic signals traveling over a wireless network (e.g., Wi-Fi).

Inventive concepts propose to address technical problems in the field by providing real time viewership data to interested parties, for example, within the context of the hospitality industry. When viewership data (e.g., number of viewers at a moment in time) is provided to interested parties in real time (e.g., less than 100 ms), the interested parties can take appropriate action to improve revenue streams and/or increase ad value.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

It is claimed:

1. A system for real time audience measurement, the system comprising:
   a display;
   an endpoint device coupled to the display; and
   a central controller configured to:
      generate a first message that flags a channel of interest from among a plurality of channels that provide content for displaying on the display;
      send the first message to the endpoint device to flag the channel of interest at the endpoint device;
      determine that the display is tuned to the channel of interest based on a change in polling rate, wherein the polling rate corresponds to a frequency at which it is determined which channel is currently being displayed on the display; and
      generate and send viewership data for the channel of interest to a first entity.

2. The system of claim 1, wherein a first portion of the viewership data comprises a first timestamp that indicates when the display tuned to the channel of interest.

3. The system of claim 2, wherein the central controller is configured to send the first portion of the viewership data to the first entity in response to determining that the display is tuned to the channel of interest.

4. The system of claim 3, wherein a second portion of the viewership data comprises a second timestamp that indicates when the display tunes away from the channel of interest.

5. The system of claim 4, wherein the central controller is configured to send the second portion of the viewership data to the first entity in response to determining that the display is tuned away from the channel of interest.

6. The system of claim 1, wherein the viewership data includes an identifier of the channel of interest.

7. The system of claim 1, wherein the central controller is configured to determine that the display is tuned to the channel of interest in response to detecting an increase in the polling rate or in response to receiving a notification of the increase in the polling rate.

8. The system of claim 1, wherein the central controller is managed by a second entity different from the first entity.

9. The system of claim 8, wherein the channel of interest is selected by the first entity.

10. The system of claim 1, wherein the endpoint device is configured to update a channel mask for the plurality of channels based on the first message.

11. The system of claim 10, wherein the central controller is configured to provide the channel mask to the endpoint device.

12. The system of claim 1, further comprising:
   a router configured to reformat messages exchanged between the central controller and the endpoint device.

13. The system of claim 12, wherein the router is configured to:
   communicate with the endpoint device over a first type of network; and
   communicate with the central controller and the first entity over a second type of network different than the first type of network.

14. The system of claim 13, wherein the first type of network corresponds to an RF network, and wherein the second type of network corresponds to an IP network.

15. The system of claim 1, wherein the central controller is configured to determine that the display tuned away from the channel of interest in response to detecting a reduction in the polling rate or in response to receiving a notification of the reduction in the polling rate.

16. A method for real time audience measurement, the method comprising:
   generating, by a central controller, a first message that flags a channel of interest from among a plurality of channels that provide content for displaying on a display;
   sending, by the central controller, the first message to an endpoint device coupled to the display to flag the channel of interest at the endpoint device;
   determining, by the central controller, that the display is tuned to the channel of interest based on a change in polling rate, wherein the polling rate corresponds to a frequency at which it is determined which channel is currently being displayed on the display; and
   generating and sending, by the central controller, viewership data for the channel of interest to a first entity.

17. The method of claim 16, wherein a first portion of the viewership data comprises a first timestamp that indicates when the display tuned to the channel of interest.

18. The method of claim 17, wherein the first portion of the viewership data is sent to the first entity in response to determining that the display is tuned to the channel of interest.

19. The method of claim 18, wherein a second portion of the viewership data comprises a second timestamp that indicates when the display tunes away from the channel of interest, and wherein the second portion of the viewership data is sent to the first entity in response to determining that the display is tuned away from the channel of interest.

20. A device for real time audience measurement, the device comprising:
   a central controller configured to:
      generate a first message that flags a channel of interest from among a plurality of channels that provide content for displaying on a display;
      send the first message to an endpoint device to flag the channel of interest at the endpoint device, the endpoint device being coupled to the display;
      determine that the display is tuned to the channel of interest based on a change in polling rate, wherein the polling rate corresponds to a frequency at which it is determined which channel is currently being displayed on the display; and
      generate and send, in response to determining that the display is tuned to the channel of interest, viewership data for the channel of interest to a first entity.

* * * * *